US012768770B2

(12) United States Patent
Chu et al.

(10) Patent No.: US 12,768,770 B2
(45) Date of Patent: Oct. 20, 2026

(54) MICROSCOPIC OPTICAL IMAGING SYSTEM FOR LIVING CELL

(71) Applicant: CLINX SCIENCE INSTRUMENTS CO., LTD, Shanghai (CN)

(72) Inventors: Debao Chu, Shanghai (CN); Huiming Wang, Shanghai (CN); Yijun Chu, Shanghai (CN); Qi Zhang, Shanghai (CN); Rongwei Cai, Shanghai (CN); Jie Gao, Shanghai (CN); Xiongqun Chen, Shanghai (CN)

(73) Assignee: CLINX SCIENCE INSTRUMENTS CO., LTD, Shanghai (CN)

( * ) Notice: Subject to any disclaimer, the term of this patent is extended or adjusted under 35 U.S.C. 154(b) by 917 days.

(21) Appl. No.: 17/916,699

(22) PCT Filed: Apr. 2, 2021

(86) PCT No.: PCT/CN2021/085393
§ 371 (c)(1),
(2) Date: Jan. 18, 2023

(87) PCT Pub. No.: WO2021/197488
PCT Pub. Date: Oct. 7, 2021

(65) Prior Publication Data

US 2023/0152210 A1 May 18, 2023

(30) Foreign Application Priority Data

Apr. 3, 2020 (CN) ......................... 202010260880.1

(51) Int. Cl.
*G02B 21/26* (2006.01)
*G01N 21/01* (2006.01)
(Continued)

(52) U.S. Cl.
CPC ......... *G01N 21/01* (2013.01); *G01N 21/6458* (2013.01); *G01N 21/6486* (2013.01);
(Continued)

(58) Field of Classification Search
CPC ................ G02B 21/00; G02B 21/0004; G02B 21/0008; G02B 21/0012; G02B 21/0016;
(Continued)

(56) References Cited

U.S. PATENT DOCUMENTS 6,850,362 B2 * 2/2005 Brooker ................ G02B 21/24 359/368
7,321,462 B2 1/2008 Yamamoto
(Continued)

FOREIGN PATENT DOCUMENTS

CN 1782777 A 6/2006
CN 101363839 A 2/2009
(Continued)

OTHER PUBLICATIONS

Aug. 8, 2023 EESR issued in European Patent Application No. 21781241.1.
(Continued)

*Primary Examiner* — Thong Q Nguyen
(74) *Attorney, Agent, or Firm* — Houston Beshining Law Office PLLC; Liangang Ye

(57) ABSTRACT

A microscopic optical imaging system for a living cell, relating to the technical field of living cell culture, observation and detection equipment. The microscopic optical imaging system for a living cell includes a sample stage device, a microscopic optical imaging device, a first linear motion device, a second linear motion device, a third linear motion device, and a worktable device. The microscopic optical imaging device is driven by the first linear motion device to move, the sample stage device is driven by the
(Continued)

third linear motion device to move, and the microscopic optical imaging device is driven by the second linear motion device to adjust the resolution for imaging, so that the imaging of living cell samples in regions is realized in a non-contact manner and the resolution for imaging is adjusted; meanwhile, the volume of the microscopic optical imaging system for a living cell is reduced.

4 Claims, 5 Drawing Sheets

(51) Int. Cl.
*G01N 21/64* (2006.01)
*G02B 21/00* (2006.01)
*G02B 21/08* (2006.01)
*G02B 21/36* (2006.01)

(52) U.S. Cl.
CPC ......... *G02B 21/0076* (2013.01); *G02B 21/08* (2013.01); *G02B 21/26* (2013.01); *G02B 21/361* (2013.01); *G01N 2021/0106* (2013.01)

(58) Field of Classification Search
CPC .............. G02B 21/002; G02B 21/0028; G02B 21/0032; G02B 21/0076; G02B 21/0088; G02B 21/0092; G02B 21/08; G02B 21/24; G02B 21/241; G02B 21/242; G02B 21/248; G02B 21/26; G02B 21/34; G02B 21/36; G02B 21/361; G02B 21/362; G01N 21/01; G01N 21/6458; G01N 21/6486
USPC .................................................. 359/368–398
See application file for complete search history.

(56) References Cited

U.S. PATENT DOCUMENTS

| | | | |
|---|---|---|---|
| 9,019,497 B2 | 4/2015 | Wang | |
| 2005/0105172 A1 | 5/2005 | Hasegawa | |
| 2008/0266653 A1 | 10/2008 | Korpinen | |
| 2008/0291534 A1 | 11/2008 | Okugawa | |
| 2009/0121154 A1 | 5/2009 | Westphal | |
| 2009/0161205 A1* | 6/2009 | Harada | G02B 21/26 359/385 |
| 2012/0105600 A1 | 5/2012 | Meyer | |
| 2018/0064321 A1 | 3/2018 | Muramatsu | |

FOREIGN PATENT DOCUMENTS

| | | | |
|---|---|---|---|
| CN | 202710836 | U | 1/2013 |
| CN | 103412398 | A | 11/2013 |
| CN | 106054366 | A | 10/2016 |
| CN | 106333650 | A | 1/2017 |
| CN | 106707488 | A | 5/2017 |
| CN | 106918544 | A | 7/2017 |
| CN | 109143563 | A | 1/2019 |
| CN | 208476788 | U | 2/2019 |
| CN | 109632721 | A | 4/2019 |
| CN | 110057724 | A | 7/2019 |
| CN | 209707371 | U | 11/2019 |
| CN | 110888230 | A | 3/2020 |
| CN | 210128918 | U | 3/2020 |
| CN | 212134466 | U | 12/2020 |
| IT | UA20162851 | A1 | 10/2017 |
| JP | H07128243 | A | 5/1995 |
| JP | 2015197623 | A | 11/2015 |
| JP | 5882524 | B1 | 3/2016 |

OTHER PUBLICATIONS

Sep. 4, 2023 first Office Action issued in European Patent Application No. 21781241.1.
Jun. 24, 2021 International Search Report issued in International Patent Application No. PCT/CN2021/085393.
Jun. 24, 2021 Written Opinion of the International Searching Authority issued in International Patent Application No. PCT/CN2021/085393.
Jan. 19, 2023 First Office Action issued in Indian Patent Application No. 202227062687.
Apr. 21, 2025 Search Report issued in Chinese Patent Application No. CN202010260880.1.
Apr. 21, 2025 First Office Action issued in Chinese Patent Application No. CN202010260880.1.
Aug. 8, 2025 Second Office Action issued in European Patent Application No. 21781241.1.
Sep. 3, 2025 Second Office Action issued in Chinese Patent Application No. CN202010260880.1.
Dec. 23, 2025 Rejection Notice issued in Chinese Patent Application No. CN202010260880.1.

* cited by examiner

MICROSCOPIC OPTICAL IMAGING SYSTEM FOR LIVING CELL

CROSS-REFERENCE TO RELATED APPLICATIONS

The present application is a National Stage of International Application No. PCT/CN2021/085393, filed on Apr. 2, 2021, which claims the priority of Chinese patent application CN2020102608801 filed on Apr. 3, 2020. The contents of the Chinese patent application are incorporated herein by reference in their entirety.

BACKGROUND OF THE INVENTION

Field of the Invention

The present invention relates to the technical field of living cell culture, observation and detection equipment, in particular, to a microscopic optical imaging system for a living cell.

Description of Related Art

Biological microscopic technology is used by medical and health institutions, universities and research institutes to observe microorganisms, cells, bacteria, tissue culture, suspensions and sediments, and processes of multiplication and division of cells and bacteria in a culture solution can be continuously observed. The biological microscopic technology is widely used in cytology, parasitology, oncology, immunology, genetic engineering, industrial microbiology, botany and other fields.

A microscopic optical imaging system for a living cell uses the biological microscopic technology to collect information and perform time lapse capturing, so as to automatically track and monitor growth statuses of cells in real time throughout the process. The growth statuses of living cells are recorded in real time by a non-invasive method, and qualitative and quantitative analysis is carried out during imaging. The microscopic optical imaging system for a living cell has a wide range of applications, such as tissue culture, cell culture in vitro, tumor cell drug screening, and stem cell research in biological and medical fields.

The existing microscopic optical imaging system for a living cell has two structures. In one structure, both a sample stage device and a microscopic optical imaging device are fixed. To capture different regions of a living cell sample or adjust the resolution, the sample stage device needs to be manually adjusted. In the other structure, the sample stage device is mobile in some directions, while the microscopic optical imaging device is fixed. To capture different regions of the living cell sample or adjust the resolution, the sample stage device is moved. However, the sample stage device takes up a large space in the moving process, and the corresponding space needs to be reserved in the microscopic optical imaging system for a living cell. As a result, the microscopic optical imaging system for a living cell has a large system volume.

BRIEF SUMMARY OF THE INVENTION

The technical problems to be solved in the present invention are to overcome the above shortcomings in the related art, and a non-contact microscopic optical imaging system for a living cell with a small occupation space is provided.

The present invention solves the above technical problems through the following technical solutions:

A microscopic optical imaging system for a living cell includes:

- a sample stage device;
- a microscopic optical imaging device, used for optically imaging a living cell sample in the sample stage device;
- a first linear motion device, used for driving the microscopic optical imaging device to move left and right;
- a second linear motion device, used for driving the microscopic optical imaging device to move up and down;
- a third linear motion device, used for driving the sample stage device to move forward and backward; and
- a worktable device, wherein the sample stage device, the microscopic optical imaging device, the first linear motion device, the second linear motion device and the third linear motion device are all arranged on the worktable device.

Preferably, the microscopic optical imaging device includes a visible light optical component, a fluorescent light optical component, an objective lens, and a camera component. The visible light optical component is arranged above the sample stage device, and the fluorescent light optical component, the objective lens and the camera component are all arranged below the sample stage device.

The first linear motion device includes an upper motion mechanism and a lower motion mechanism which are arranged in linkage. The upper motion mechanism is used for driving the visible light optical component, and the lower motion mechanism is used for driving the fluorescent light optical component, the objective lens, and the camera component.

The second linear motion device is used for driving the objective lens to move up and down.

Preferably, the upper motion mechanism includes a first screw motor arranged on the worktable device and used for driving the visible light optical component. The lower motion mechanism includes a second screw motor arranged on the worktable device and used for driving the fluorescent light optical component, the camera component and the objective lens. The first screw motor and the second screw motor are arranged in linkage.

Preferably, the first linear motion device further includes an upper guide mechanism and a lower guide mechanism which are both arranged on the worktable device. The visible light optical component is slidably arranged on the worktable device through the upper guide mechanism. The fluorescent light optical component, the camera component and the objective lens are slidably arranged on the worktable device through the lower guide mechanism together.

Preferably, the first linear motion device further includes a bracket. The fluorescent light optical component, the camera component and the objective lens are detachably arranged on the bracket, and a front end and a rear end of the bracket are slidably arranged on the worktable device through the lower guide mechanism respectively. The lower motion mechanism drives the bracket to move left and right.

Preferably, each of the upper guide mechanism and the lower guide mechanism includes:

- a guide rail, arranged on the worktable device; and
- a sliding block, arranged slidably in a one-to-one correspondence manner to the guide rail, wherein the sliding block is connected to the visible light optical component or the bracket.

Preferably, the second linear device includes a third screw motor arranged on the worktable device. The third screw motor drives the objective lens to move up and down. The first linear motion device is further used for driving the third screw motor to move left and right.

Preferably, the third linear motion device includes a fourth screw motor arranged on the worktable device, and the fourth screw motor drives the sample stage device to move forward and backward.

Preferably, visible light generated by the visible light optical component irradiates the sample stage device, wherein the visible light passing through the living cell sample enters the camera component through the objective lens. The fluorescent light optical component excites the living cell sample to generate biological fluorescent light, and the biological fluorescent light enters the camera component through the objective lens.

There is one visible light optical component, one fluorescent light optical component, one objective lens and one camera component. Or, there is one visible light optical component, one objective lens and one camera component, and there are several fluorescent light optical components.

Preferably, the visible light optical component includes a visible light source, a first reflector, and a first condensing lens. Visible light generated by the visible light source irradiates the sample stage device after being processed by the first reflector and the first condensing lens in sequence.

Preferably, the visible light source is a bright field light source. Or, the visible light source is a phase difference light source, and the visible light optical component further includes a phase difference ring arranged between the phase difference light source and the first reflector.

Preferably, the fluorescent light optical component includes a fluorescent light source. Or, the fluorescent light optical component includes several fluorescent light sources, and the various fluorescent light sources are used for generating excitation lights in different colors. At least one fluorescent light source runs during fluorescent light imaging.

Preferably, the optical component includes three fluorescent light sources, namely a first fluorescent light source, a second fluorescent light source and a third fluorescent light source. The microscopic optical imaging system for a living cell further includes a first dichroscope, a second dichroscope, a third dichroscope, and a first filter.

Excitation light of the first fluorescent light source passes through the first dichroscope, the second dichroscope and the first filter in sequence, and is reflected into the objective lens by the third dichroscope.

Excitation light of the second fluorescent light source passes through the second dichroscope and the first filter in sequence after being reflected by the first dichroscope, and is reflected into the objective lens by the third dichroscope.

Excitation light of the third fluorescent light source passes through the first filter after being reflected by the second dichroscope, and is reflected into the objective lens by the third dichroscope.

Preferably, the camera component includes a second reflector, a second condensing lens, a second filter, and a camera.

The biological fluorescent light generated by exciting the living cell sample or the visible light passing through the living cell sample enter the camera after being successively processed by the objective lens, the second reflector, the second filter and the second condensing lens.

Preferably, the microscopic optical imaging system for a living cell further includes a lower shell and an upper shell. The fluorescent light optical component, the objective lens, the camera component, the lower motion mechanism, the second linear motion device and the third linear motion device are accommodated in the lower shell, and the worktable device is covered at an upper opening of the lower shell. The visible light optical component and the upper motion mechanism are accommodated in the upper shell, and a lower end of the upper shell is fixedly connected to the worktable device.

On the basis of satisfying common knowledge in the art, all the above preferred conditions can be combined randomly to obtain all the preferred examples of the present invention.

The present invention has positive progressive results:

In the present invention, the microscopic optical imaging device is driven by the first linear motion device to move, the sample stage device is driven by the third linear motion device to move, and the microscopic optical imaging device is driven by the second linear motion device to adjust the resolution for imaging, so that the imaging of living cell samples in various regions is realized in a non-contact manner and the resolution for imaging is adjusted; and meanwhile, the volume of the microscopic optical imaging system for a living cell is reduced.

Figure 1:
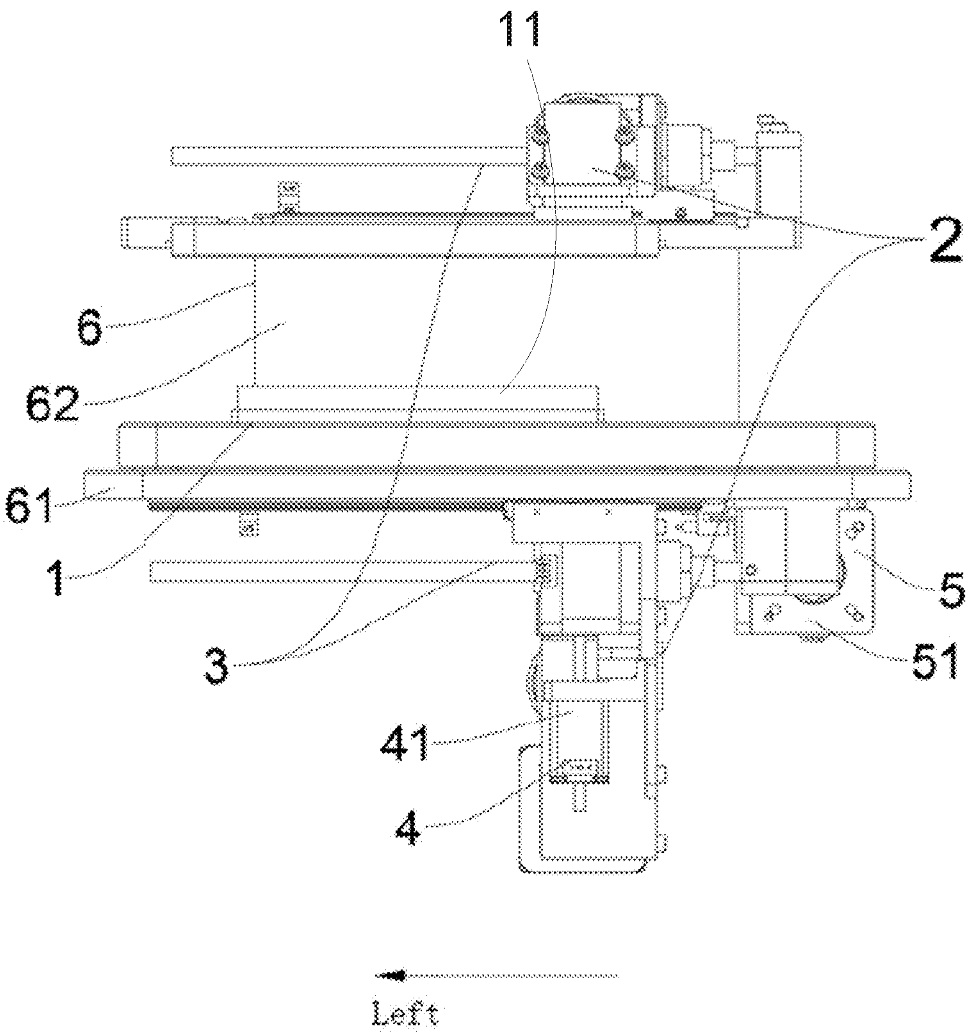
FIG. 1 is a first schematic diagram of a microscopic optical imaging system for a living cell according to one embodiment of the present invention.

NUMERALS IN THE DRAWINGS sample stage device 1, living cell sample 11
microscopic optical imaging device 2
visible light optical component 21
visible light source 211
first reflector 212
first condensing lens 213
phase difference ring 214
fluorescent light optical component 22
first fluorescent light source 221
second fluorescent light source 222
third fluorescent light source 223
first dichroscope 224
second dichroscope 225
third dichroscope 226
first filter 227
objective lens 23
camera component 24
second reflector 241
second condensing lens 242 second filter 243
camera 244
first linear motion device 3
upper motion mechanism 31
first screw motor 311
lower motion mechanism 32
upper guide mechanism 33, sliding block 331
lower guide mechanism 34
bracket 35
second screw motor 321
second linear motion device 4
third screw motor 41
third linear motion device 5
fourth screw motor 51
worktable device 6
working platform member 61
observation hole 611
upper mounting frame 62
shell 7
upper shell 71
lower shell 72

DETAILED DESCRIPTION OF THE INVENTION

The present invention will be further described below in a manner of embodiments, but the present invention is not limited to the scope of the embodiments accordingly.

The front, back, left, right, top and bottom involved in any of the following embodiments are all located in the same coordinate system, wherein the direction shown by the arrow in FIG. 1 is left.

Referring to FIG. 1, an embodiment of the present invention provides a microscopic optical imaging system for a living cell for capturing living cells. Captured information can at least be used for observing, detecting and tracking living cell samples. The captured information can be transmitted to an electronic terminal, such as a mobile phone and a computer.

The microscopic optical imaging system for a living cell of the embodiment of the present invention includes a sample stage device 1, a microscopic optical imaging device 2, a first linear motion device 3, a second linear motion device 4, a third linear motion device 5, and a worktable device 6.

The sample stage device 1 is used for directly or indirectly carrying a living cell sample 11. The sample stage device 1 is connected to the worktable device 6 and can move forward and backward relative to the worktable device 6.

The microscopic optical imaging device 2 can move left and right relative to the worktable device 6. The microscopic optical imaging device 2 is used for performing optical imaging on the living cell samples 11 in the sample stage device 1.

The first linear motion device 3 is arranged on the worktable device 6, and an output end of the first linear motion device 3 outputs linear reciprocating motion. The output end is connected to the microscopic optical imaging device 2, and drives the microscopic optical imaging device 2 to move left and right, so as to adjust its relative position relationship with the sample stage device 1 in a left-right direction, thus performing optical imaging on the living cell samples 11 in different regions in the left-right direction. In the left-right direction, a space occupied by the microscopic optical imaging device 2 is smaller than that occupied by the sample stage device 1. The space occupied by the observation of the living cell samples 11 in different regions by adjusting the microscopic optical imaging device 2 is smaller, thus reducing the overall space required by the microscopic optical imaging system for a living cell.

The second linear motion device 4 is arranged on the worktable device 6, and an output end of the second linear motion device 4 outputs linear reciprocating motion. The output end is connected to the microscopic optical imaging device 2, and drives the microscopic optical imaging device 2 to move up and down, so as to adjust a relative position relationship between the microscopic optical imaging device 2 and the sample stage device 1 in an up-down direction, thus adjusting the resolution for imaging.

The third linear motion device 5 is arranged on the worktable device 6, and an output end of the third linear motion device 5 outputs linear reciprocating motion. The output end is connected to the sample stage device 1, and drives the sample stage device 1 to move forward and backward, so as to adjust a relative position relationship between the sample stage device 1 and the microscopic optical imaging device 2 in a front-back direction, thus performing optical imaging on the living cell samples 11 in different regions in the front-back direction.

The worktable device 6 integrates the sample stage device 1, the microscopic optical imaging device 2, the first linear motion device 3, the second linear motion device 4 and the third linear motion device 5, which improves the compactness of the microscopic optical imaging system for a living cell.

It can be seen from the above that the microscopic optical imaging system for a living cell of the embodiment of the present invention at least achieves the following effects:

First, the microscopic optical imaging device 2 is driven by the first linear motion device 3 to move, and the sample stage device 1 is driven by the third linear motion device 5 to move, thus achieving an effect of imaging the living cell samples 11 in various regions in the front-back direction and the left-right direction in a non-contact manner.

Second, the microscopic optical imaging device 2 is further driven by the second linear motion device 4 to move up and down to adjust the resolution for imaging, thereby further reducing a contact operation between an operator and the sample stage device 1, as well as the microscopic optical imaging device 2, when the microscopic optical imaging system for a living cell is used. In other words, on the basis of a structural relationship between the second linear motion device 4 and the microscopic optical imaging device 2, the automation of the microscopic optical imaging system for a living cell is further improved, and the contact between the operator and the system is reduced.

Thirdly, the relative position relationship between the sample stage device 1 and the microscopic optical imaging device 2 is adjusted through the first linear motion device 3, the second linear motion device 4 and the third linear motion device 5, thereby improving the control accuracy of the system.

Fourth, when the relative position relationship between the sample stage device 1 and the microscopic optical imaging device 2 is adjusted, the left-right direction and the up-down direction are realized by adjusting the microscopic optical imaging device 2, and the front-back direction is realized by adjusting the sample stage device 1, instead of adjusting the left-right direction, the up-down direction, and the front-back direction on the sample stage device 1 or the microscopic optical imaging device 2, so that the positions of the first linear motion device 3, the second linear motion device 4 and the third linear motion device 5 are dispersed according to the positions of the sample stage device 1 and the microscopic optical imaging device 2, which optimizes a stress on the worktable device 6, prolongs the life of the microscopic optical imaging system for a living cell, and reduces the volume of the microscopic optical imaging system for a living cell.

The microscopic optical imaging system for a living cell further includes a control device (not shown in the figure) through which the first linear motion device 3, the second linear motion device 4 and the third linear motion device 5 are all controlled. The control device may include any one of a microprocessor, a central processor and a microcontroller.

Figure 2:
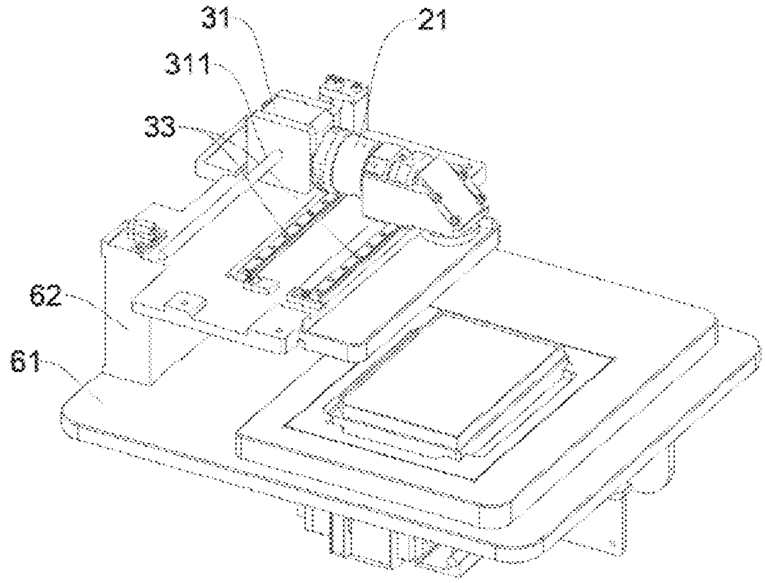
FIG. 2 is a second schematic diagram of a microscopic optical imaging system for a living cell according to one embodiment of the present invention.
Figure 3:
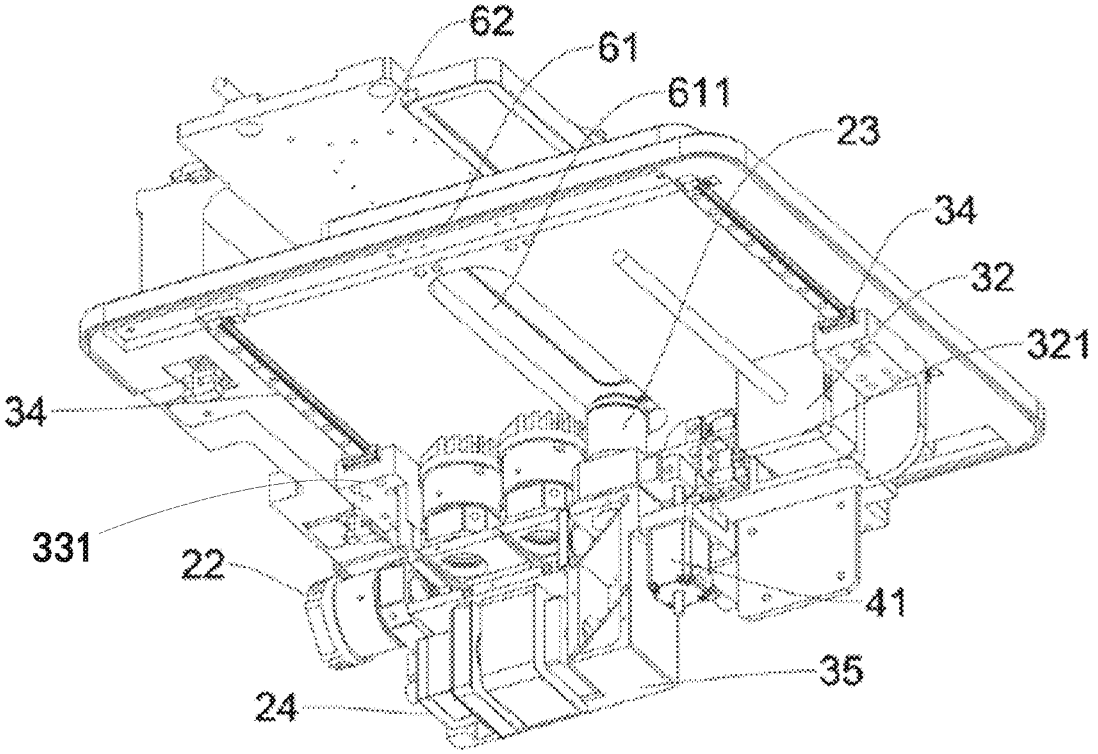
FIG. 3 is a third schematic diagram of a microscopic optical imaging system for a living cell according to one embodiment of the present invention.

Referring to FIGS. 2-3, the microscopic optical imaging device 2 includes a visible light optical component 21, a fluorescent light optical component 22, an objective lens 23, and a camera component 24. The visible light optical component 21 is arranged above the sample stage device 1, and the fluorescent light optical component 22, the objective lens 23 and the camera component 24 are all arranged below the sample stage device 1. The first linear motion device 3 includes an upper motion mechanism 31 and a lower motion mechanism 32 which are arranged in linkage. The upper motion mechanism 31 is used for driving the visible light optical component 21, and the lower motion mechanism 32 is used for driving the fluorescent light optical component 22, the objective lens 23, and the camera component 24.

The visible light optical component 21 is used for generating visible light which irradiates the sample stage device 1 from the top. Part of the visible light is shielded by the living cell sample 11, while part of the visible light is not shielded by the living cell sample 11, which passes through the living cell sample 11 and reaches the camera component 24 via the objective lens 23. Preferably, the visible light optical component 21 is located directly above the sample stage device 1 to facilitate a visible light beam to vertically enter the sample stage device 1.

The fluorescent light optical component 22 is used for generating excitation light which irradiates the sample stage device 1 from the bottom. The living cell sample 11 is excited to generate biological fluorescent light which reaches the camera component 24 through the objective lens 23.

The objective lens 23 is independently arranged relative to the visible light optical component 21 and the fluorescent light optical component 22. The second linear motion device 4 only needs to drive the objective lens 23 to move up and down to adjust the resolution for imaging. Compared with the method for adjusting the resolution by adjusting the sample stage device 1 and the entire microscopic optical imaging device 2, this way saves a larger space, thus reducing the total volume of the microscopic optical imaging system for a living cell. Actually, in other examples, as an alternative solution, the second linear motion device 4 does not independently drive the objective lens 23 to move up and down, but drives the entire microscopic optical imaging device 2 to move up and down to achieve the effect of adjusting the resolution, which also falls within the protection scope of the present invention.

The camera component 24 is used for receiving the visible light or the biological fluorescent light for imaging. The camera component 24 may transmit the captured information to the electronic terminal through the control device or directly.

During use, one of the visible light optical component 21 and the fluorescent light optical component 22 is used. When the visible light optical component 21 is used for imaging, the visible light optical component 21, the objective lens 23 and the camera component 24 work, and the visible light passing through the living cell sample 11 enters the camera component 24 through the objective lens 23. When the fluorescent light optical component 22 is used for imaging, the fluorescent light optical component 22, the objective lens 23 and the camera component 24 work, and the biological fluorescent light generated by the living cell sample 11 enters the camera component 24 through the objective lens 23. In other words, the microscopic optical imaging system for a living cell of the embodiment of the present invention integrates two imaging functions: visible light imaging and fluorescent light imaging. The two imaging functions share the objective lens 23 and the camera component 24, thus reducing the volume of the system on the basis of the two imaging functions.

It can be seen from the above that, on the one hand, the fluorescent light optical component 22 performs irradiation from the bottom of the sample stage device 1, and on the other hand, the visible light and biological fluorescent light passing through the living cell sample 11 need to enter the objective lens 23 located below the sample stage device 1 to reach the camera component 24. Therefore, the worktable device 6 is provided with an observation hole 611 to achieve the effects of the above two aspects. The observation hole 611 is located directly below the sample stage device 1, and the objective lens 23 is located directly below the observation hole 611. The visible light and the biological fluorescent light enter the objective lens 23 through the observation hole 611.

The upper motion mechanism 31 outputs the linear reciprocating motion. The upper motion mechanism 31 is arranged above the sample stage device 1, so as to be closely connected with the visible light optical component 21, thereby saving the space occupied by the microscopic optical imaging system for a living cell.

The lower motion mechanism 32 outputs the linear reciprocating motion. The lower motion mechanism 32 is arranged below the sample stage device 1, so as to be closely connected with the fluorescent light optical component 22, the objective lens 23 and the camera component 24, thereby saving the space occupied by the microscopic optical imaging system for a living cell.

The upper motion mechanism 31 and the lower motion mechanism 32 are linked. The linkage setting here is understood as that they are started and stopped synchronously. When started, they output the same direction and displacement synchronously. The upper motion mechanism 31 and the lower motion mechanism 32 are controlled by the control device.

It can be seen from the above that in the example of the present invention, the microscopic optical imaging device 2 has a visible light imaging manner and a fluorescent light imaging manner. The visible light optical component 21 and the fluorescent light optical component 22 are respectively arranged above and below the sample stage device 1 in space, so that the optical paths of the two imaging manners do not affect each other. By means of decomposing the first linear motion device 3 into the upper motion mechanism 31 and the lower motion mechanism 32 to respectively control different portions of the microscopic optical imaging device 2, the layout of physical structures of the first linear motion device 3 and the microscopic optical imaging device 2 is optimized, making the microscopic optical imaging system for a living cell more compact, and also optimizing the stress condition of the worktable device 6.

Referring to FIGS. 1-3, the worktable device 6 preferably includes a working table member 61 and an upper mounting frame 62. Preferably, the sample stage device 1 is convexly arranged on the working platform member 61. The fluorescent light optical component 22, the objective lens 23, the camera component 24, the lower motion mechanism 32, the second linear motion device 4 and the third linear motion device 5 are all arranged below the working platform member 61. A lower part of the upper mounting frame 62 is fixedly connected to the working platform member 61. The visible light optical component 21 and the upper motion mechanism 31 are arranged on an upper part of the upper mounting frame 62.

As shown in FIGS. 2-3, the upper motion mechanism 31 includes a first screw motor 311 arranged on the worktable device 6. The first screw motor 311 is used for driving the visible light optical component 21. The lower motion mechanism 32 includes a second screw motor 321 arranged on the worktable device 6. The second screw motor 321 is used for driving the fluorescent light optical component 22, the camera component 24 and the objective lens 23. The first screw motor 311 and the second screw motor 321 are linked.

The first screw motor 311 is mounted on an upper part of the worktable device 6, preferably on the upper part of the upper mounting frame 62. The first screw motor 311 outputs linear reciprocating motion in the left-right direction to drive the visible light source 211. The first screw motor 311 is preferably a stepping motor. Actually, in other examples, as an alternative means, the upper motion mechanism 31 can output motions in the left-right direction through other linear motion mechanisms, such as a linear motion mechanism based on a cylinder, a hydraulic cylinder, an electric cylinder or a cam mechanism.

The second screw motor 321 is mounted below the worktable device 6, preferably on the working platform member 61. The second screw motor 321 outputs linear reciprocating motion in the left-right direction to drive the fluorescent light optical component 22, the camera component 24 and the objective lens 23. The second screw motor 321 is preferably a stepping motor. Actually, in other examples, as an alternative means, the lower motion mechanism 32 can output motions in the left-right direction through other linear motion mechanisms, such as a linear motion mechanism based on a cylinder, a hydraulic cylinder, an electric cylinder or a cam mechanism.

The first screw motor 311 and the second screw motor 321 adopt a linkage setting manner, and their starts, stops, output directions and displacements are controlled by the control device.

Referring to FIGS. 2-3, the first linear motion device 3 further includes an upper guide mechanism 33 and a lower guide mechanism 34 which are both located on the worktable device 6. The visible light optical component 21 is slidably connected with the worktable device 6 through the upper guide mechanism 33. The fluorescent light optical component 22, the camera component 24 and the objective lens 23 are slidably connected with the worktable device 6 through the lower guide mechanism 34 together.

The upper guide mechanism 33 is used for guiding the visible light optical component 21, thereby improving the stability and accuracy of the visible light optical component 21 during operation. Preferably, the upper guide mechanism 33 is arranged on the upper part of the upper mounting frame 62, so as to be closely connected with the visible light optical component 21.

The lower guide mechanism 34 is used for guiding the fluorescent light optical component 22, the camera component 24 and objective lens 23, thereby improving the stability and accuracy of the fluorescent light optical component 22, the camera component 24 and the objective lens 23 during operation. Preferably, the lower guide mechanism 34 is arranged on the working platform member 61 to improve the compactness of the system.

Figure 4:
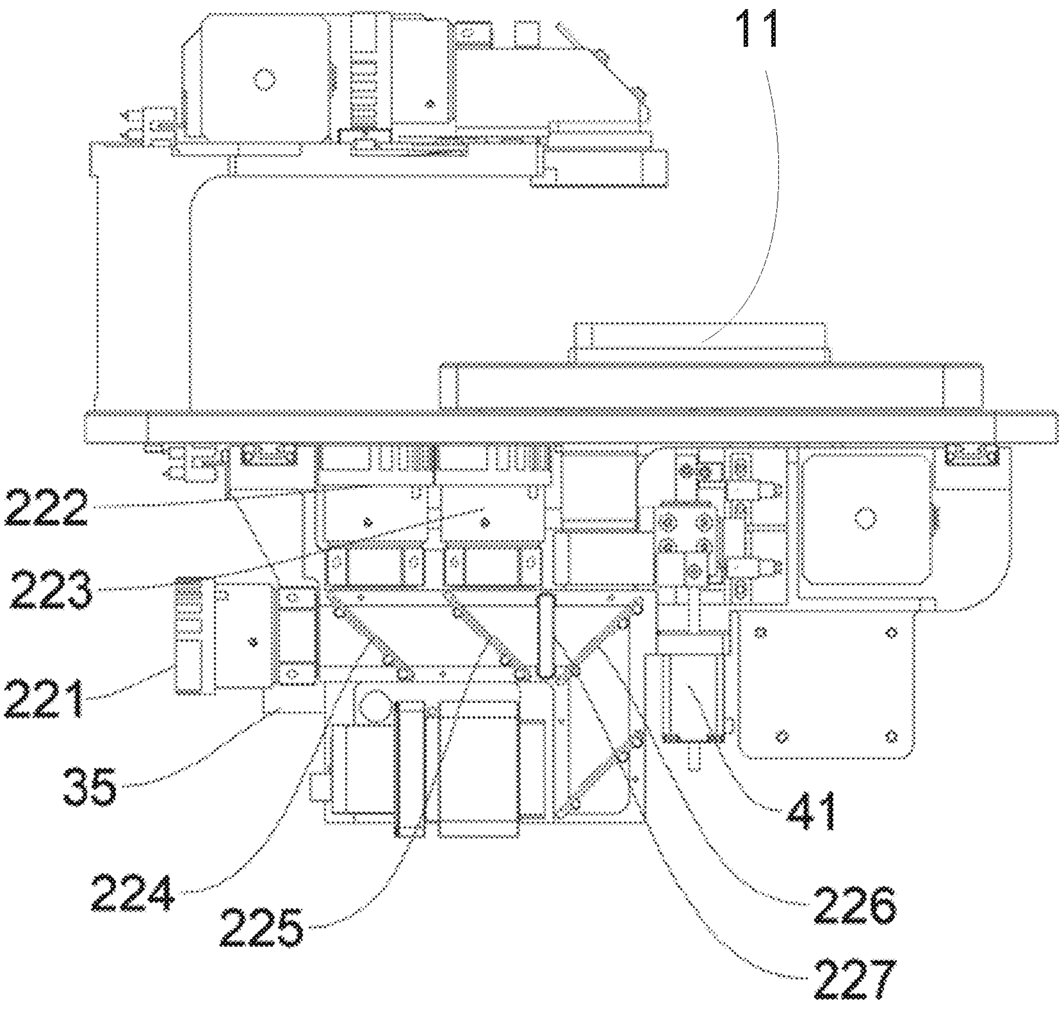
FIG. 4 is a fourth schematic diagram of a microscopic optical imaging system for a living cell according to one embodiment of the present invention.

Referring to FIGS. 3-4, the first linear motion device 3 further includes a bracket 35. The fluorescent light optical component 22, the camera component 24 and the objective lens 23 are detachably arranged on the bracket 35, and a front end and rear end of the bracket 35 are slidably arranged on the worktable device 6 through the lower guide mechanism 34. An output end of the lower motion mechanism 32 is connected with the bracket 35.

The fluorescent light optical component 22, the camera component 24 and the objective lens 23 are integrated together through the bracket 35, which improves the compactness of the structure. The lower motion mechanism 32 drives the bracket 35 to enable the fluorescent light optical component 22, the camera component 24 and the objective lens 23 to move left and right, so that the position relationships of the fluorescent light optical component 22, the camera component 24 and the objective lens 23 relative to the sample stage device 1 can be adjusted synchronously, and the accuracy of the microscopic optical imaging system for a living cell is improved. The front end and rear end of the bracket 35 are both slidably connected to the lower guide mechanism 34, which further improves the stability and accuracy of the fluorescent light optical component 22, the camera component 24 and the objective lens 23 during operation.

Each of the upper guide mechanism 33 and the lower guide mechanism 34 includes a guide rail and a sliding block 331. The guide rails and the sliding blocks 331 are arranged in a one-to-one correspondence manner. The guide rails are mounted on the worktable device 6, and the sliding blocks 331 are slidably arranged on the guide rails. The sliding blocks 331 are connected to the fluorescent light optical component 22 or the bracket 35.

Referring to FIGS. 1, 3 and 4, the second linear device includes a third screw motor 41 arranged on the worktable device 6. The third screw motor 41 drives the objective lens 23 to move up and down. The first linear motion device 3 is further used for driving the third screw motor 41 to move left and right.

The third screw motor 41 outputs linear reciprocating motion in the up-down direction, and its output end is connected to the objective lens 23. Preferably, the third screw motor 41 is indirectly mounted on the working platform member 61 through the bracket 35. The bracket 35, the fluorescent light optical component 22, the camera component 24, the objective lens 23 and the third screw motor 41 move synchronously when the lower motion mechanism 32 drives the bracket 35 to move left and right.

Referring to FIG. 1, the third linear motion device 5 includes a fourth screw motor 51 arranged on the worktable device 6. The fourth screw motor 51 drives the sample stage device 1 to move forward and backward.

The fourth screw motor 51 outputs linear reciprocating motion in the front-back direction, and an output end of the fourth screw motor 51 is connected to the sample stage device 1. To connect the sample stage device 1, a preferred method is to form a through hole in the worktable device 6, and the output end of the fourth screw motor 51 is arranged in the through hole in a penetrating manner and connected to the sample stage device. During the movement, the output end of the fourth screw motor 51 moves forward and backward in the through hole.

Actually, the third linear motion device 5 may further include front and back guide mechanisms (not shown in the figure). The sample stage device 1 is slidably connected to the worktable device 6 through the front and back guide mechanisms to improve the stability and accuracy of the sample stage device 1 during movement. The front and back guide mechanisms include guide rails and sliding blocks 331 which are arranged in a one-to-one correspondence manner. The guide rails are preferably mounted on the working platform member 61. The sliding blocks 331 are connected to the sample stage device 1, and the sliding blocks 331 are slidably connected with the guide rails.

The first linear motion device 3, the second linear motion device 4 and the third linear motion device 5, as well as the structural relationships between the various linear motion devices and the microscopic optical imaging device 2, the worktable device 6 as well as the sample stage device 1, have been described in detail above. The descriptions of the microscopic optical imaging device 2 and the worktable device 6 have also been involved to a certain extent. The microscopic optical imaging device 2 and the worktable device 6 are further described in detail below.

In the microscopic optical imaging device 2, the visible light generated by the visible light optical component 21 irradiates the sample stage device 1. The visible light passing through the living cell sample 11 enters the camera component 24 through the objective lens 23. The fluorescent light optical component 22 excites the living cell sample 11 to generate biological fluorescent light, and the biological fluorescent light enters the camera component 24 through the objective lens 23.

Figure 5:
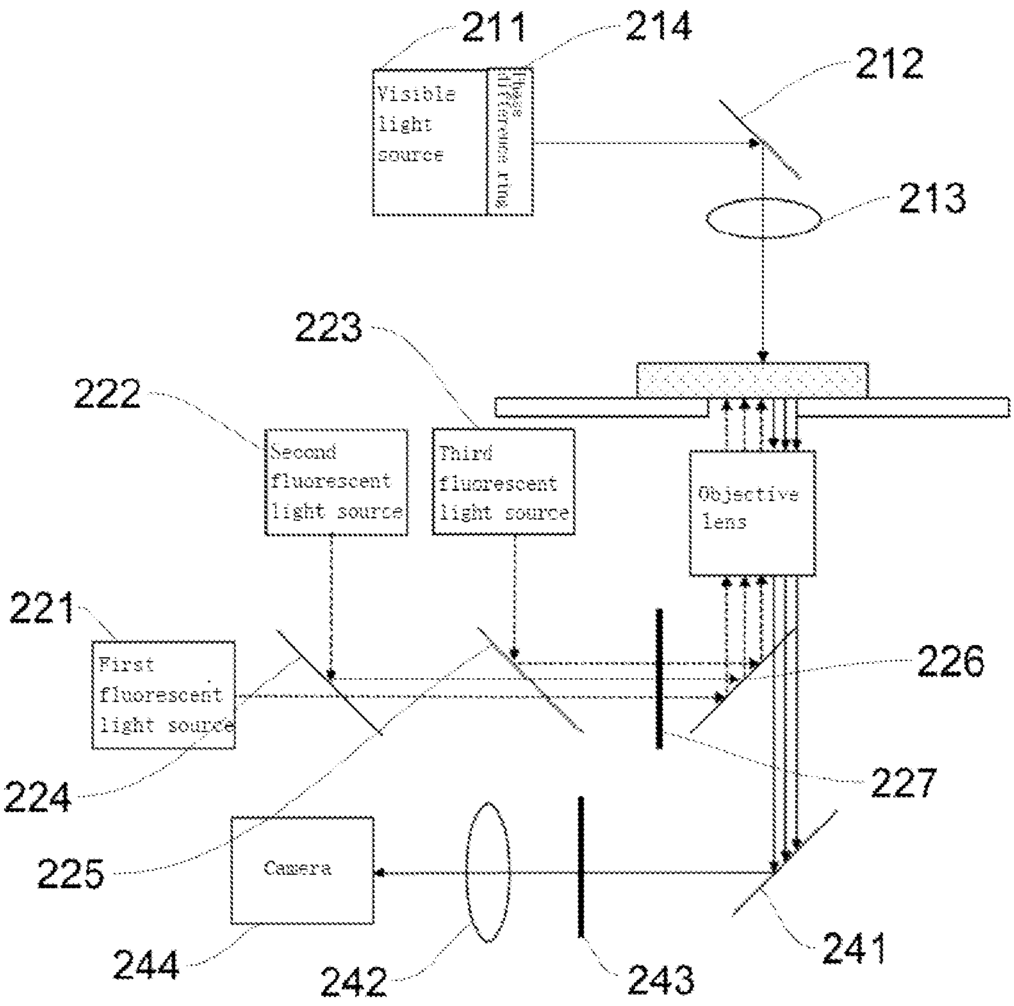
FIG. 5 is an optical path diagram of a microscopic optical imaging system for a living cell according to one embodiment of the present invention.

In one example, as shown in FIGS. 4-5, there is one visible light optical component 21, one fluorescent light optical component 22, one objective lens 23 and one camera component 24.

In another example, as an alternative means, there is one visible light optical component 21, one objective lens 23 and one camera component 24, but there are several fluorescent light optical components 22. Preferably, each fluorescent light optical component 22 can be uniformly distributed around a circumference of the objective lens at intervals to optimize the stress on the worktable device 6. In this embodiment, the several fluorescent light optical components 22 and the visible light optical component 21 share the same objective lens 23, which improves the processing capacity and the compactness of the system.

Referring to FIGS. 4-5, the visible light optical component 21 includes a visible light source 211, a first reflector 212, and a first condensing lens 213. Visible light generated by the visible light source 211 irradiates the living cell sample 11 in the sample stage device 1 after being processed by the first reflector 212 and the first condensing lens 213 in sequence.

The visible light source 211 is preferably located directly above the sample stage device 1. Preferably, the first reflector 212 and the first condensing lens 213 are located directly above the living cell sample 11.

Further, in one example, the visible light source 211 can be a bright field light source, and white light generated by the bright field light source is reflected into the first condensing lens 213 through the reflector and the further irradiates the living cell sample 11. The visible light passing through the living cell sample 11 enters the camera component 24 for imaging after being processed by the objective lens 23.

As shown in FIGS. 4-5, in another example, as an alternative means, the visible light source 211 is a phase difference light source. The visible light optical component 21 further includes a phase difference ring 214 located between the phase difference light source and the first reflector 212. The visible light generated by the phase difference light source irradiates the living cell sample 11 after being processed by the phase difference ring 214, reflected by the first reflector 212 and constrained by the first condensing lens 213. The visible light passing through the living cell sample 11 enters the camera component 24 for imaging after being processed by the objective lens 23. It should be noted that the solid lines with arrows in FIG. 5 represent a visible light propagation path to the sample stage device 1. These solid lines do not actually exist.

The fluorescent light optical component 22 includes at least one fluorescent light source. The excitation light generated by the fluorescent light source irradiates the bottom of the sample stage device 1 through the objective lens 23, thereby exciting the living cell sample 11 to generate the biological fluorescent light.

In one example, one fluorescent light source is arranged in the fluorescent light optical component 22.

In another example, as an alternative means, the fluorescent light optical component 22 is provided with several fluorescent light sources. The various fluorescent light sources are used for generating excitation lights in different colors. Each fluorescent light source can be used independently, and the brightness of each fluorescent light source is independently adjustable. Within the same period, only one fluorescent light source can be used, or multiple fluorescent light sources can be used at the same time. When there are various kinds of living cell samples 11 in the sample stage device 1, and each living cell sample 11 is required to be excited with biological fluorescent lights in different bands (or colors), the multiple fluorescent light sources work simultaneously. Each living cell sample 11 preferably corresponds to one fluorescent light source.

Referring to FIGS. 4-5, the fluorescent light optical component 22 is provided with three fluorescent light sources, namely the first fluorescent light source 221, the second fluorescent light source 222 and the third fluorescent light source 223. The fluorescent light optical component 22 further includes a first dichroscope 224, a second dichroscope 225, a third dichroscope 226, and a first filter 227. Excitation light of the first fluorescent light source 221 passes through the first dichroscope 224, the second dichroscope 225 and the first filter 227 in sequence, and is reflected into the objective lens 23 by the third dichroscope 226. Excitation light of the second fluorescent light source 222 passes through the second dichroscope 225 and the first filter 227 in sequence after being reflected by the first dichroscope 224, and is reflected into the objective lens 23 by the third dichroscope 226. Excitation light of the third fluorescent light source 223 passes through the first filter 227 after being reflected by the second dichroscope 225, and is reflected into the objective lens 23 by the third dichroscope 226.

Wavelength ranges (or colors) of the excitation lights generated by the first fluorescent light source 221, the second fluorescent light source 222 and the third fluorescent light source 223 are different. Correspondingly, wavelength ranges (or colors) of the biological fluorescent lights generated by the living cell samples 11 excited by different excitation lights are also different.

The third dichroscope 226 is used for reflecting the excitation light into the objective lens 23. The second dichroscope 225 is used for reflecting the excitation light of the third fluorescent light source 223 into the third dichroscope 226, and also for allowing the excitation lights of the first fluorescent light source 221 and the second fluorescent light source 222 to pass. The first dichroscope 224 is used for reflecting the excitation light of the second fluorescent light source 222 into the third dichroscope 226, and also for allowing the excitation light of the first fluorescent light source 221 to pass.

In addition, the first filter 227 is preferably a three-band band-pass filter.

FIGS. 4-5 show a structure of the fluorescent light optical component 22. The first dichroscope 224, the second dichroscope 225, the first filter 227 and the third dichroscope 226 are arranged in sequence in the front-back direction. The third dichroscope 226 is located directly below the objective lens 23. The third dichroscope 226 is arranged slantwise to reflect the excitation light incident in a horizontal direction into vertical light. Tilting directions of the second dichroscope 225 and the first dichroscope 224 are opposite to a tilting direction of the third dichroscope 226. The second dichroscope 225 reflects the vertical excitation light emitted by the third fluorescent light source 223 into horizontal light and propagates it to the third dichroscope 226. The first side 224 reflects the vertical excitation light of the second fluorescent light source 222 into horizontal light and propagates it to the third dichroscope 226.

Correspondingly, the third fluorescent light source 223 is located directly above the second dichroscope 225. The second fluorescent light source 222 is located directly above the first dichroscope 224. The first fluorescent light source 221 is located on one side close to the first dichroscope 224 and is used for generating horizontal excitation light. It should be noted that the dotted lines with arrows in FIG. 5 represent three propagation paths corresponding to three kinds of excitation lights, but these dotted lines actually do not exist.

Referring to FIGS. 4-5, the camera component 24 includes a second reflector 241, a second condensing lens 242, a second filter 243, and a camera 244. The biological fluorescent light generated by the excited living cell sample 11 or the visible light passing through the living cell sample 11 enters the camera 244 after being processed by the objective lens 23, the second reflector 241, the second filter 243 and the second condensing lens 242.

The second reflector 241 is located directly below the objective lens 23, specifically below the third dichroscope 226. The visible light or biological fluorescent light enters the second reflector after passing through the third dichroscope 226. The second filter 243 is preferably a three-band band-pass filter. It should be noted that the solid lines with arrows in FIG. 5 represent propagation paths of lights (including the biological fluorescent light and the visible light), but these solid lines do not actually exist.

The respective structures and mutual cooperative relationships of the above six portions of the microscopic optical imaging system for a living cell of the present invention, i.e. the sample stage device 1, the microscopic optical imaging device 2, the first linear motion device 3, the second linear motion device 4, the third linear motion device 5 and the worktable device 6, are described in detail in combination with the accompanying drawings. In one example, the microscopic optical imaging system for a living cell further includes a shell 7 used for accommodating part of the devices of the microscopic optical imaging system for a living cell.

Figure 6:
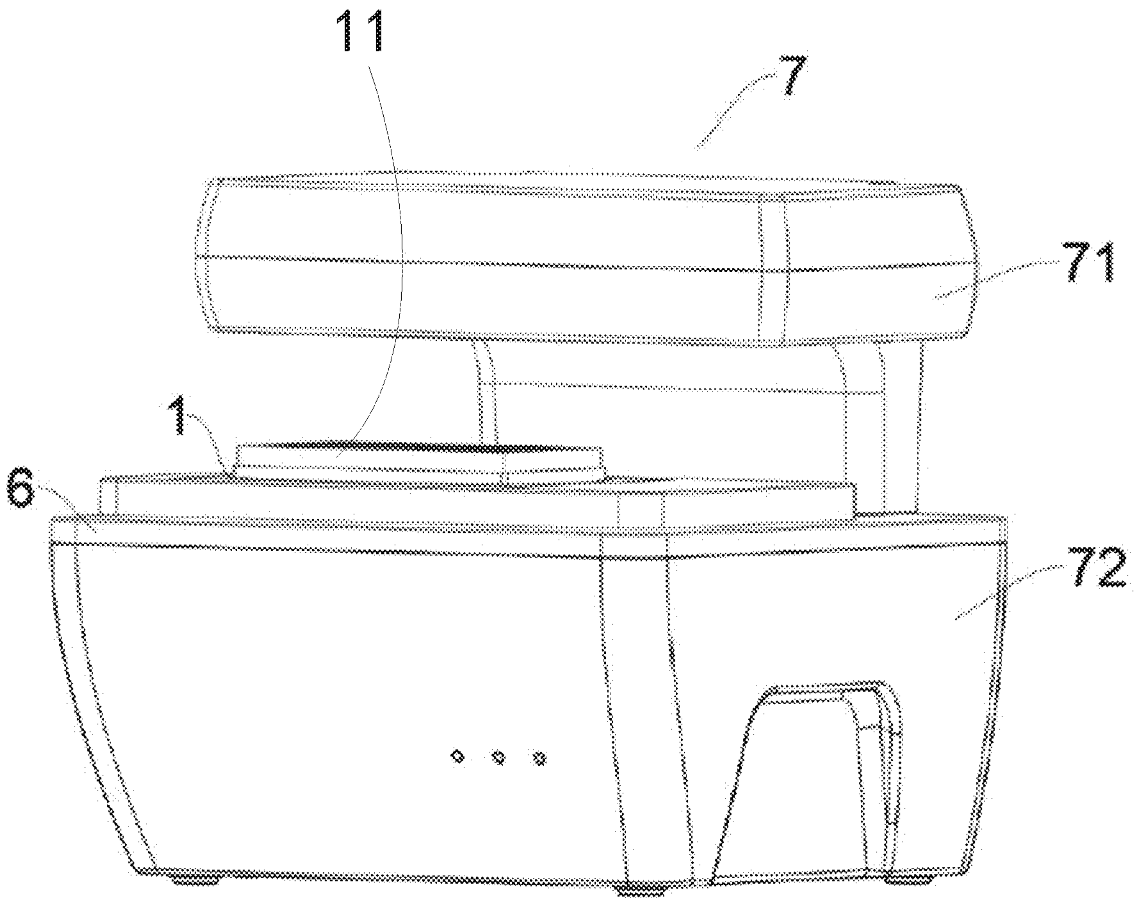
FIG. 6 is a fifth schematic diagram of a microscopic optical imaging system for a living cell according to one embodiment of the present invention.

Referring to FIG. 6, the shell 7 specifically includes an upper shell 71 and a lower shell 72. The fluorescent light optical component 22, the objective lens 23, the camera component 24, the lower motion mechanism 32, the second linear motion device 4 and the third linear motion device 5 are accommodated in the lower shell 72. A lower surface of the working platform member 61 is covered at an upper opening of the lower shell 72. The visible light optical component 21 and the upper motion mechanism 31 are accommodated in the upper shell 71, and the upper mounting frame 62 is also accommodated in the upper shell 71. A lower opening of the upper shell 71 is fixedly connected to the upper surface of the working platform member 61.

A position of the upper shell 71 corresponding to the visible light optical component 21 is provided with an open window or a closed window with a transparent baffle plate, so that the visible light generated by the visible light optical component 21 irradiates the living cell sample 11 through the window.

Although the specific embodiments of the present invention are described above, those skilled in the art should understand that these embodiments are only examples, and various changes or modifications can be made to these implementations without departing from the principle and essence of the present invention. Therefore, the protection scope of the present invention is limited by the appended claims.

What is claimed is:

1. A microscopic optical imaging system for a living cell, comprising:

a sample stage device;

a microscopic optical imaging device, used for optically imaging a living cell sample in the sample stage device;

a first linear motion device, used for driving the microscopic optical imaging device to move left and right;

a second linear motion device, used for driving the microscopic optical imaging device to move up and down;

a third linear motion device, used for driving the sample stage device to move forward and backward; and a worktable device, wherein the sample stage device, the microscopic optical imaging device, the first linear motion device, the second linear motion device and the third linear motion device are all arranged on the worktable device;

wherein the microscopic optical imaging device comprises a visible light optical component, a fluorescent light optical component, an objective lens, and a camera component; the visible light optical component is arranged above the sample stage device, and the fluorescent light optical component, the objective lens and the camera component are all arranged below the sample stage device;

the first linear motion device comprises an upper motion mechanism and a lower motion mechanism which are arranged such that the upper motion mechanism and the lower motion mechanism are started and stopped synchronously; the upper motion mechanism is used for driving the visible light optical component, and the lower motion mechanism is used for driving the fluorescent light optical component, the objective lens, and the camera component;

the upper motion mechanism comprises a first screw motor arranged on the worktable device and used for driving the visible light optical component; the lower motion mechanism comprises a second screw motor arranged on the worktable device and used for driving the fluorescent light optical component, the camera component and the objective lens; and the first screw motor and the second screw motor are arranged such that the first screw motor and the second screw motor are started and stopped synchronously, wherein the first linear motion device further comprises an upper guide mechanism and a lower guide mechanism which are both arranged on the worktable device; the visible light optical component is slidably arranged on the worktable device through the upper guide mechanism; the fluorescent light optical component, the camera component and the objective lens are slidably arranged on the worktable device through the lower guide mechanism together.

2. The microscopic optical imaging system for the living cell according to claim 1, wherein the first linear motion device further comprises a bracket; the fluorescent light optical component, the camera component and the objective lens are detachably arranged on the bracket, and a front end and a rear end of the bracket are slidably arranged on the worktable device through the lower guide mechanism respectively; and the lower motion mechanism drives the bracket to move left and right.

3. The microscopic optical imaging system for the living cell according to claim 2, wherein each of the upper guide mechanism and the lower guide mechanism comprises:

a guide rail, arranged on the worktable device; and a sliding block, arranged slidably in a one-to-one correspondence manner to the guide rail, wherein the sliding block is connected to the visible light optical component or the bracket.

4. The microscopic optical imaging system for the living cell according to claim 1, wherein the second linear motion device is used for driving microscopic optical imaging device to move up and down only by means of driving the objective lens to move up and down.

* * * * *